(12) United States Patent
Drebinger et al.

(10) Patent No.: US 8,965,947 B2
(45) Date of Patent: Feb. 24, 2015

(54) CONTROL AND COMMUNICATION SYSTEM INCLUDING AN ENGINEERING UNIT

(75) Inventors: Andreas Drebinger, Herzogenaurach (DE); Jochen Zingraf, Obermichelbach (DE)

(73) Assignee: Siemens Aktiengesellschaft, München (DE)

( * ) Notice: Subject to any disclaimer, the term of this patent is extended or adjusted under 35 U.S.C. 154(b) by 1029 days.

(21) Appl. No.: 12/225,829

(22) PCT Filed: Mar. 23, 2007

(86) PCT No.: PCT/EP2007/052824
§ 371 (c)(1),
(2), (4) Date: Jan. 28, 2009

(87) PCT Pub. No.: WO2007/113147
PCT Pub. Date: Oct. 11, 2007

(65) Prior Publication Data
US 2009/0132058 A1    May 21, 2009

(30) Foreign Application Priority Data
Mar. 30, 2006 (DE) .......................... 10 2006 015 160

(51) Int. Cl.
*G06F 15/16* (2006.01)
*G06F 12/00* (2006.01)
*G05B 19/042* (2006.01)

(52) U.S. Cl.
CPC .... *G05B 19/0421* (2013.01); *G05B 2219/2229* (2013.01); *G05B 2219/25144* (2013.01); *G05B 2219/25232* (2013.01); *G05B 2219/33341* (2013.01)
USPC ............ 709/201; 709/217; 710/242; 710/243

(58) Field of Classification Search
USPC ............................ 709/201, 217; 710/242, 243
See application file for complete search history.

(56) References Cited

U.S. PATENT DOCUMENTS

| | | | |
|---|---|---|---|
| 5,252,899 A | 10/1993 | Kawamura et al. | |
| 5,991,797 A * | 11/1999 | Futral et al. | 709/216 |
| 6,169,928 B1 | 1/2001 | Olson et al. | |
| 2002/0098840 A1* | 7/2002 | Hanson et al. | 455/435 |
| 2002/0180787 A1* | 12/2002 | Broussard | 345/749 |
| 2003/0110416 A1* | 6/2003 | Morrison et al. | 714/39 |
| 2003/0152034 A1* | 8/2003 | Zhang et al. | 370/252 |

FOREIGN PATENT DOCUMENTS

| | | |
|---|---|---|
| RU | 99124583 C2 | 9/2001 |
| WO | WO 0173514 A1 | 10/2001 |
| WO | WO 2006071918 A2 | 7/2006 |

* cited by examiner

*Primary Examiner* — Ranodhi Serrao

(57) ABSTRACT

A control and communication system including a number of automation units which are adapted to process signals in function plans within the automation unit and which are connected in the same level to a common communication bus for providing a peer-to-peer communication between the automation units, further includes an engineering unit being connected to the communication bus and being adapted to provide functions allowing at least one automation unit to exchange signals to a function plan which is attributed to another automation unit.

7 Claims, 4 Drawing Sheets

CONTROL AND COMMUNICATION SYSTEM INCLUDING AN ENGINEERING UNIT

CROSS REFERENCE TO RELATED APPLICATIONS

This application is the US National Stage of International Application No. PCT/EP2007/052824, filed Mar. 23, 2007 and claims the benefit thereof. The International Application claims the benefits of German application No. 10 2006 015 160.7 filed Mar. 30, 2006, both of the applications are incorporated by reference herein in their entirety.

FIELD OF INVENTION

The invention refers to a control and communication system including a number of automation units (e.g. computer units, computer plug-in modules or personal computers) which are adapted to process signals in function plans within the automation unit and which are connected in the same level to a common communication bus for providing a peer-to-peer communication between the automation units. Further the invention refers to an engineering unit for such a control and communication system. Finally, the invention refers to a method of an automated peer-to-peer communication in a control and communication system of the manner mentioned above.

BACKGROUND OF THE INVENTION

A control and communication system of said manner includes among other things a number of automation units which are connected in one level of the command structure or hierarchy of the system to a common communication bus. Such systems are also called peer-to-peer systems and the respective communication between the automation units is called peer-to-peer (PtP) communication. In these peer-to-peer systems, in order to solve control and communication objects of technical plants a particularly high number of signals has to be exchanged. Accordingly, often up to 30 automation units have to be installed at a single communication bus and up to 200 signals have to be exchanged for each communication connection and direction.

As shown in FIG. 1, in known peer-to-peer systems so called communication components or communication chips 14 and 16 have been used, which were arranged in pairs in two corresponding automation units (not shown). One of the communication components 14, the sending component, collects several signals and transmits them altogether to the corresponding receiving component 16 of the another automation unit. Thereby, each automation unit is working on the basis of a corresponding function plan. FIG. 1 shows the function plans 10 and 12 of the automation units and the corresponding communication components 14 and 16. The communication components 14 and 16 are addressed via signal connectors 18 transferring signals between a signal database (not shown) and the communication components 14. A particular partnership relation 20 is appointed between the communication components 14 and 16 by means of a partner number 22 for each partner or communication component 14 and 16, and further by means of an identification number 24 for each of the communication components 14 and 16 within the partnership relation 20. In addition, a succession relation 26 is to be defined by means of an assignment of the incoming and outgoing connections, so that the signals are not interchanged.

The disadvantages of these known systems and methods are a rather high risk of failures because of peer-to-peer communication components which have to be parameterised and interconnected manually. Further, the documentation of these manual designs is often rather incomplete, signals of different technologies are or have to be collected for a common transfer, and a navigation over several function plans is not possible either.

SUMMARY OF INVENTION

It is an object of the present invention to provide a peer-to-peer control and communication system and a method of an automated peer-to-peer communication in a control and communication system in which the above mentioned problems are overcome, and by which the risk of failures in the peer-to-peer communication is reduced.

According to the invention, the object is solved by a control and communication system including a number of automation units which are adapted to process signals in function plans within the automation unit and which are connected in the same level to a common communication bus for providing a peer-to-peer communication between the automation units, and further including an engineering unit being connected to the communication bus and being adapted to provide functions allowing at least one automation unit to exchange signals to a function plan which is attributed to another automation unit.

In a preferred embodiment of the invention the functions includes allowing the at least one automation unit to present the signals to be exchanged to a function plan which is attributed to another automation unit in the same way as those signals to be exchanged within the automation unit.

Further, according to the invention, the object is solved by a control and communication system including a number of automation units which are adapted to process signals in function plans within the automation unit, which are adapted to transmit the signals within the automation unit via signal connectors, and which are connected in the same level to a common communication bus for providing a peer-to-peer communication between the automation units, and further including an engineering unit being connected to the communication bus and being adapted to represent signal connections overlapping automation units in the same way as the signal connectors.

In such a control and communication system according to the invention it is further preferred that the engineering unit being adapted to provide a list of those signals which are to be received by the other automation unit when the at least one automation unit intends to exchange signals to a function plan which is attributed to the other automation system.

The list of those signals which are to be received by the other automation unit preferably includes a version number for an unambiguous identification of the list. Thus, the risk of confusion in the signal transfer can be reduced.

In addition, preferably, each automation unit is adapted to keep two consecutive versions of the list. The two consecutive versions may provide the basis for a roll back functionality in the peer-to-peer communication system according to the invention.

Further preferred, the automation units each include a peer-to-peer system function being adapted to manage all peer-to-peer connections of an automation unit.

The peer-to-peer system function of the receiving automation unit should advantageously be adapted to copy the list in a sending buffer of the receiving automation unit. During this step the old list might be kept in the background of the sending buffer of the receiving automation unit.

For a further improvement of such a system, the peer-to-peer system function of the receiving automation unit should be adapted to send the list from the receiving automation unit to the sending automation unit.

In addition, the peer-to-peer system function of the sending automation unit should be adapted to copy the list to a receiving buffer of the sending automation unit.

In a further preferred peer-to-peer communication the peer-to-peer system function of the sending automation unit is adapted to copy all relevant signals according to the list from a signal data base to a sending buffer of the sending automation unit.

Furthermore, the peer-to-peer system function of the sending automation unit should be adapted to send all signals of the sending buffer to the receiving automation unit.

For a final check of the entire transmission, the peer-to-peer system function of the receiving automation unit should be adapted to compare all received signals with the list in the corresponding sending buffer and to copy all correct signals to a signal data base of the receiving automation unit.

The problem underlying the invention is further solved by an engineering unit for a control and communication system including a number of automation units which are adapted to process signals in function plans within the automation unit and which are connected in the same level to a common communication bus for providing a peer-to-peer communication between the automation units, the engineering unit being adapted to be connected to the communication bus and being adapted to provide a list of those signals which are to be received by a receiving automation unit when at least one sending automation unit intends to exchange signals to a function plan which is attributed to the receiving automation unit.

Further preferred the engineering unit is adapted to provide the list of those signals which are to be received by the receiving automation unit with a version number for an unambiguous identification of the list.

Said object is further solved according to the invention by means of a method of an automated peer-to-peer communication in a control and communication system, the control and communications system including a number of automation units which are adapted to process signals in function plans within the automation unit and which are connected in the same level to a common communication bus for providing a peer-to-peer communication between the automation units, the method including the step of allowing at least one automation unit to exchange signals to a function plan which is attributed to another automation unit in the same way as those signals to be exchanged within the automation unit.

Alternatively or additionally, the object is solved by means of a method of an automated peer-to-peer communication in a control and communication system, the control and communication system including a number of automation units which are adapted to process signals in function plans within the automation unit, which are adapted to transmit the signals within the automation unit via signal connectors, and which are connected in the same level to a common communication bus for providing a peer-to-peer communication between the automation units, the method including the step of representing signal connections overlapping automation units in the same way as the signal connectors.

Preferably, said methods according to the invention include the step of providing a list of those signals which are to be received by a receiving automation unit when at least one sending automation unit intends to exchange signals to a function plan which is attributed to the receiving automation system.

Further preferred, said methods includes the step of providing a version number at the list of those signals which are to be received by the receiving automation unit for an unambiguous identification of the list.

In order to provide a roll back functionality, it is further preferred that the methods include the step of keeping two consecutive versions of the list in each automation unit.

The methods should further include the step of copying the list in a sending buffer of the receiving automation unit. Thereby, the old list should be kept in the background of the sending buffer.

The list should be further send from the receiving automation unit to the sending automation unit.

At the sending automation unit it is further preferred to copy the list to a receiving buffer of the sending automation unit.

Further preferred, the methods according to the invention should include the step of copying all relevant signals according to the list from a signal data base to a sending buffer of the sending automation unit.

Thereafter, all signals of the sending buffer should be send to the receiving automation unit.

As a kind of final quality check, all received signals should be compared with the list in the corresponding sending buffer of the receiving automation unit. Thereafter, all correct signals should be copied to a signal data base of the receiving automation unit.

The solutions according to the invention provide the advantage that the risk of communication failures caused by the developer and user is reduced to a minimum. There is no further danger of using the wrong communication partner, using overlapping signal areas or interchanging signals. The documentation of the systems according to the invention can be reduced to the technical features only, and there is no need for design and adjustment of visible communication components by the user.

Additionally, according to the invention, by the peer-to-peer communication systems and methods all comfortable functions for a function-plan-overlapping navigation of the engineering system, even for peer-to-peer signals, are supported.

In case of amendments or modifications of the assignment of function plans to particular automation systems, no troublesome redesign of automation-system-overlapping signals is necessary. According to the invention, internal signals of automation systems become peer-to-peer signals, and vice versa.

BRIEF DESCRIPTION OF THE DRAWINGS

A preferred embodiment of a control and communication system, an engineering system and a method of an automated peer-to-peer communication in a control and communication system according to the invention will be described hereinafter referring to the enclosed schematical drawings. Therein.

DETAILED DESCRIPTION OF INVENTION

Figure 1:
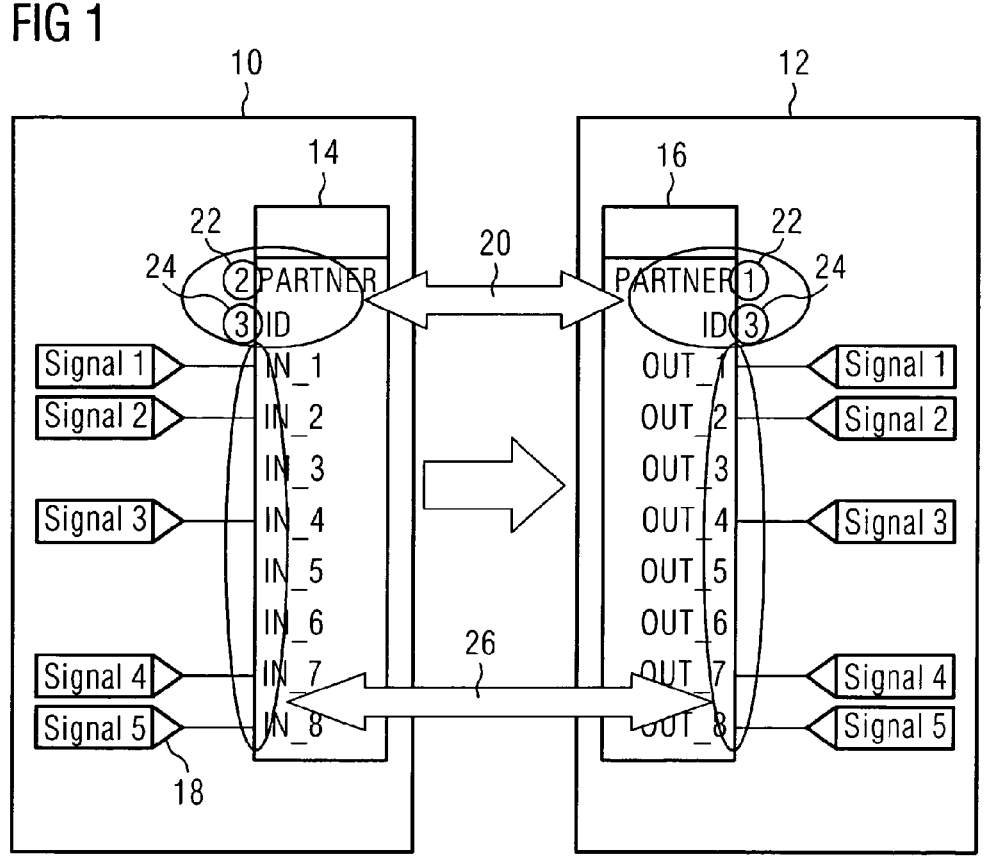
FIG. 1 shows the peer-to-peer communication proceeding between two automation units of prior art as described above.
Figure 2:
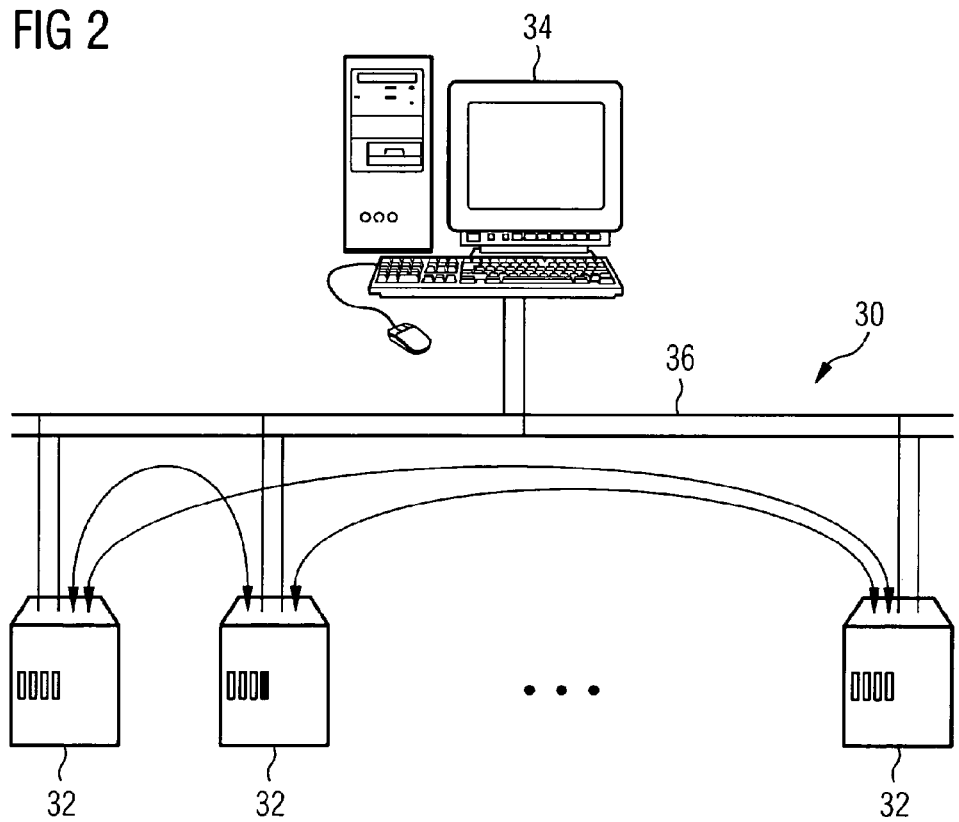
FIG. 2 shows an embodiment of a control and communication system according to the invention.

In FIG. 2 a control and communication system 30 is depicted which includes a number of automation units 32 and an engineering unit 34. The automation units 32 and the engineering 34 are realised by computer plug-in modules and by a personal computer, which are each adapted to process signals in corresponding function plans.

Further, the automation units 32 and the engineering unit 34 are each connected to a common communication bus 36. The communication bus 36 is provided in a redundant manner and is adapted to link or interconnect said units with each other, transferring signals among the automation units 32 and between the automation units 32 and the engineering unit 34.

During the signal transfer among the automation units 32, all automation units 32 have the same communication-hierarchy level, thus providing a peer-to-peer communication between the automation units 32.

The engineering unit 34 is also connected to the communication bus 36 and is adapted to provide functions allowing at least one automation unit 32 to exchange signals to a function plan which is attributed to another automation unit 32. In particular (see FIG. 4), the engineering unit 34 provides functions, which allow a first automation unit handling a first function plan 38 to present signals 40 to be exchanged to a second function plan 42 which is attributed to a second automation unit in the same way as those signals to be exchanged within the automation unit.

Figure 3:
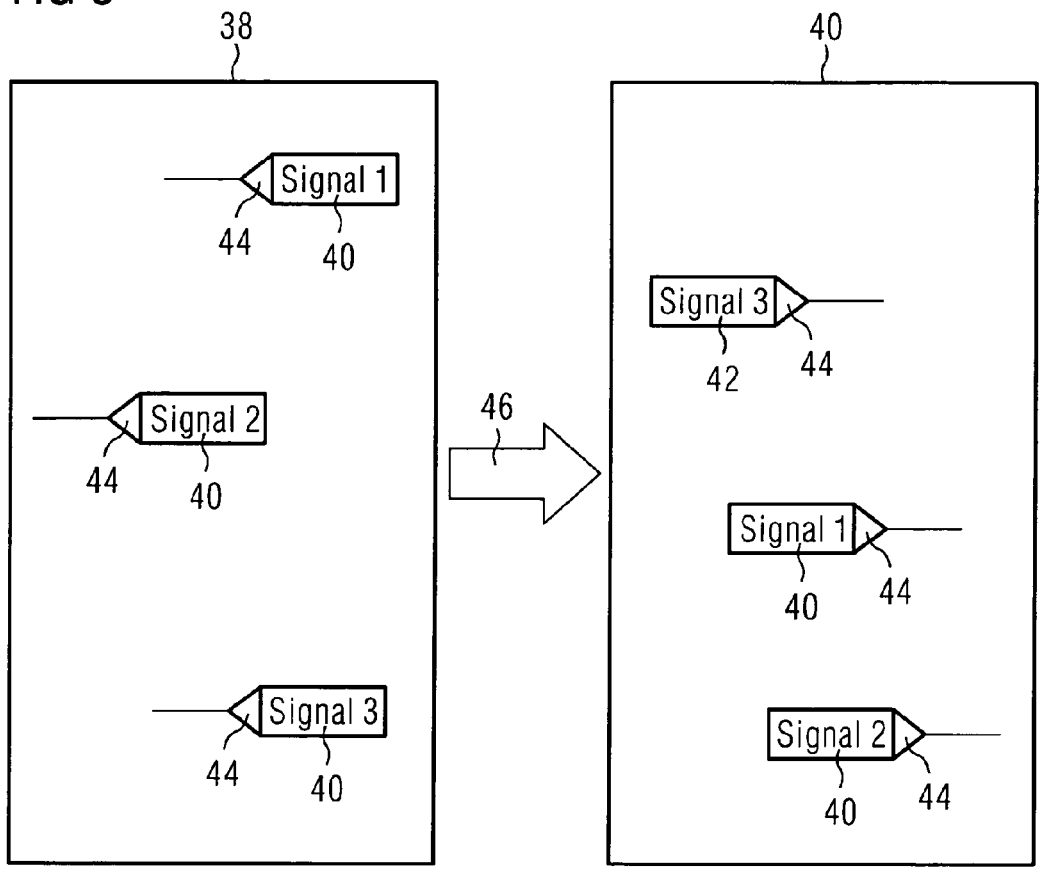
FIG. 3 shows a peer-to-peer communication proceeding between two automation units of the control and communication system according to FIG. 2.

For the exchange of signals within each automation unit 32, the signals are provided with so called signal connectors 44 (see FIG. 3), which include information about the signal connections to be provided for the corresponding signals. The engineering unit 34 is adapted to represent signal connections 46 overlapping automation units in the same way as the signal connectors 44.

Figure 4:
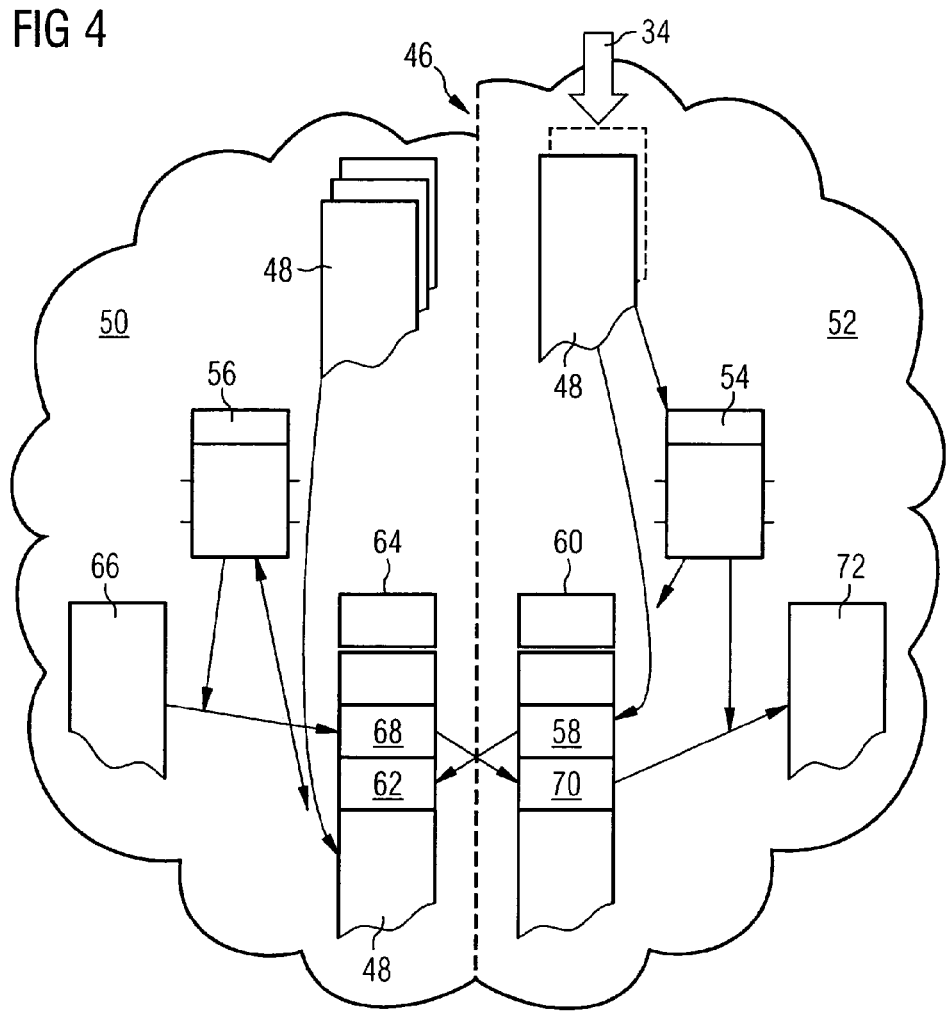
FIG. 4 shows an embodiment of a method of an automated peer-to-peer communication in a control and communication system according to FIG. 2.

According to FIG. 4, this is achieved by the engineering unit 34 in that it provides a list 48 of those signals 40 which are to be received by the other automation unit (so called peer-to-peer list, which may be advantageously provided by the sending automation unit).

In other words, the list 48 is created, when a first automation unit 50 including the first function plan 38 intends to exchange signals 40 to a second automation unit 52 which is handling the second function plan 42.

The list 48 of those signals 40 which are to be received by the second automation unit 52 includes a version number for an unambiguous identification of the list 48. The list 48 is sent to and received by the second automation unit 52, which is adapted to store both, the list 48 and an older version of said list, which was previously supplied.

The first and the second automation units 50 and 52 further each include a peer-to-peer system function 54 and 56, being adapted to manage all peer-to-peer connections of the corresponding automation unit 50 and 52, respectively. The peer-to-peer system function 56 of the receiving second automation unit 50 is adapted to copy the list 48 in a sending buffer 58 of a peer-to-peer entity data component 60 of the receiving second automation unit 52. An older version of the list 48 is kept in the background of said sending buffer 58.

The peer-to-peer system function 56 of the receiving second automation unit 52 is further adapted to send the list from the second automation unit 52 to the first automation unit 50, where it is stored to a receiving buffer 62 of a corresponding peer-to-peer entity data component 64. The peer-to-peer system function 54 of the first automation unit 50, which is, in this case, the sending automation unit, is further adapted to copy all relevant signals 40 according to the list 48 from a signal database 66 to a sending buffer 68 of the sending first automation unit 50.

In addition, the peer-to-peer system function 54 of the sending first automation unit 50 sends all signals 40 of the sending buffer 68 to the receiving second automation unit 52, where they are stored in a receiving buffer 70 of the peer-to-peer entity data component 60 of the second automation unit 52.

Finally, the peer-to-peer system function 56 of the receiving second automation unit 52 is adapted to compare all received signals 40 with the list 48 in the corresponding sending buffer 58 and to copy all correct signals 40 to a signal database 72 of the receiving second automation unit 52.

The invention claimed is:

1. A control and communication system, comprising:
   a plurality of automation units, each of the plurality of automation units adapted to process signals corresponding to a function plan and each of the plurality of automation units connected in a same level to a common communication bus for providing a peer-to-peer communication between the plurality of automation units;
   an engineering unit connected to the communication bus and adapted to provide functions allowing a first automation unit to exchange signals to the function plan processed in a second automation unit; and
   a list of signals provided to the second automation unit by the engineering unit,
   wherein the list of signals is provided when the first automation unit intends to exchange signals to the function plan processed in the second automation unit,
   wherein the list of signals includes a version number for an unambiguous identification of the list of signals,
   wherein the first and second automation units keep two consecutive versions of the list,
   wherein each of the plurality of automation units include a peer-to-peer system function that manages all peer-to-peer connections,
   wherein the peer-to-peer system function of the second automation unit copies the list into a sending buffer of the second automation unit, and
   wherein the peer-to-peer system function of the second automation unit sends the list from the second automation unit to the first automation unit.

2. The control and communication system according to claim 1, wherein the functions include allowing the first automation unit to present signals to be exchanged to the function plan processed in the second automation unit in a same way as signals to be exchanged within the first automation unit.

3. The control and communication system according to claim 1, wherein the peer-to-peer system function of the first automation unit copies the list to a receiving buffer of the first automation unit.

4. The control and communication system according to claim 3, wherein the peer-to-peer system function of the first automation unit copies all relevant signals according to the list from a signal data base to a sending buffer of the first automation unit.

5. The control and communication system according to claim 4, wherein the peer-to-peer system function of the first automation unit sends all signals of the sending buffer to the second automation unit.

6. The control and communication system according to claim 5, wherein the peer-to-peer system function of the second automation unit compares all received signals with the list in the corresponding sending buffer and copies all correct signals to a signal data base of the second automation unit.

7. A method of an automated peer-to-peer communication in a control and communication system, comprising:

adapting a plurality of automation units to each process signals corresponding to a function plan, wherein each of the plurality of automation units is connected in a same level to a common communication bus for providing a peer-to-peer communication between the plurality of automation units, wherein each of the plurality of the automation units includes a peer-to-peer system function that manages all peer-to-peer connections;

providing an engineering unit connected to the communication bus and adapted to provide functions such that a first automation unit exchanges signals to the function plan processed in a second automation unit;

transmitting via the communication bus a list of signals to be received by the second automation unit when the first automation unit intends to exchange signals to the function plan processed in the second automation unit;

providing a version number of the list of signals to be received by the second automation unit for an unambiguous identification of the list of signals;

keeping two consecutive versions of the list of signals in the first and second automation units;

copying the list of signals into a sending buffer of the second automation unit using the peer-to-peer system function of the second automation unit;

sending the list of signals from the second automation unit to the first automation unit using the peer-to-peer system function of the second automation unit; and copying the list of signals to a receiving buffer of the first automation unit.

\* \* \* \* \*